United States Patent

Katayama et al.

[11] Patent Number: 5,944,644
[45] Date of Patent: Aug. 31, 1999

[54] ROLL OF WINDING EQUIPMENT IN ROLLING FACTORY

[75] Inventors: Toshiyuki Katayama, Chiba; Shinsuke Kai, Fukuoka; Sakuhiko Kumade, Chiba, all of Japan

[73] Assignee: Nippon Steel Hardfacing Co., Ltd., Tokyo, Japan

[21] Appl. No.: 08/817,604

[22] PCT Filed: Aug. 29, 1996

[86] PCT No.: PCT/JP96/02424

§ 371 Date: Apr. 18, 1997

§ 102(e) Date: Apr. 18, 1997

[87] PCT Pub. No.: WO97/08089

PCT Pub. Date: Mar. 6, 1997

[30] Foreign Application Priority Data

Aug. 30, 1995 [JP] Japan .................................. 7-243891

[51] Int. Cl.⁶ .................................................. B23P 15/00
[52] U.S. Cl. ................................................ 492/54; 492/58
[58] Field of Search ........................................ 492/54, 58

[56] References Cited

U.S. PATENT DOCUMENTS

| | | | |
|---|---|---|---|
| 4,771,524 | 9/1988 | Barbezat et al. | 492/54 |
| 4,796,342 | 1/1989 | Miihkinen | 492/54 |
| 5,161,306 | 11/1992 | Nakahara et al. | 492/54 |
| 5,445,589 | 8/1995 | Shimizu | 492/54 |

FOREIGN PATENT DOCUMENTS

| | | | |
|---|---|---|---|
| 402092405 | 4/1990 | Japan | 492/54 |
| 403081091 | 4/1991 | Japan | 492/54 |
| 403086306 | 4/1991 | Japan | 492/54 |

*Primary Examiner*—I. Cuda
*Attorney, Agent, or Firm*—Kaensaka & Takeuchi

[57] ABSTRACT

A roll of a winding equipment in a rolling factory is formed of a roll body, a hardened buildup substrate formed on a surface of the roll body, and a carbide-particle-dispersed-type autogenous-alloy-sprayed layer having a thickness of at least 0.5 mm and formed on the substrate. The autogenous-alloy-sprayed layer contains 3–60% by weight of carbide particles or complex carbide particles. The carbide particles or complex carbide particles have a particulate shape or a leaf shape with a size of 3–300 μm. The roll can exhibit good abrasion resistance and plate flaw resistance, and good conveyance property for a passing plate material.

2 Claims, 2 Drawing Sheets

ROLL OF WINDING EQUIPMENT IN ROLLING FACTORY

TECHNICAL FIELD

The present invention relates to a roll of a down coiler (hereinafter simply referred to as "each roll" or "roll"), provided within a winding equipment in a rolling factory as an iron manufacturing arrangement, wherein said roll has a hardened buildup substrate on a surface of its body and a carbide-particle-dispersed type autogenous-alloy-sprayed layer upon said substrate.

BACKGROUND ART

Generally, each roll of a winding equipment in a rolling factory suffers abrasion due to: corrosive environment caused by contact with cooling water and high temperature passing plate material (900° C. or less); sliding on the passing plate material; and impact at the time of inrushing of the passing plate material.

Performance required for, each roll includes, mainly, gripping force on passing plate material (a friction coefficient), plate flaw (slip flaw and flaw by seizure) resistance, and the like.

As for an arrangement of rolls, as shown in FIG. 2, an equipment for winding and coiling high temperature plate material 10 of 400–900° C., which has been rolled to standard size, comprises, for each coiler, upper and lower pinch rolls 11, 1, and wrapper rolls (unit rolls) 6–9 located around each coiler mandrel, and sometimes, comprises pinch rolls 11, 1 located independently in front of a group of coilers. The pinch rolls and wrapper rolls perform tension adjustment, conveyance, and a change of direction, between apparatuses after and before them, i.e., between a finishing mill and a coiler, contributing to smooth winding in the coiler and to putting a winding shape in good order.

Surfaces of the pinch rolls 1 shown in FIG. 2 suffer abrasion due to contact with and slide on the high temperature passing plate material 10 accompanying pressing force of the upper pinch rolls 11, and due to corrosion by cooling water. Further, the wrapper rolls (unit rolls) are used in the similar severe conditions.

If a shape of a roll body is changed by the above-described abrasion, it accompanies changes in the pinch force and pressing force on the passing plate material, and becomes cause of deformation of the winding shape and generation of plate flaws. Therefore, usually, each roll is exchanged in a short life period of about one month, producing a great loss respecting an operating ratio of the equipment and repair cost.

For pinching and conveying the passing plate material, it is necessary to ensure a suitable friction coefficient of the roll surface. When the value of the friction coefficient is small, there arises severe slips or seizure, inviting a loss such as flaws in the passing plate material, exchange of rolls, or the like.

As a roll in the winding equipment, one of the steel group such as a hardened buildup product, a tinned product, or a forged steel product is mainly used. Those products, however, have reached their limit of performance for attaining both the abrasion resistance and plate flaw resistance, and attaining stable operation and stable operational cost property. These products do not have sufficient abrasion resistance, conveyance resistance, and plate flaw resistance at the same time.

Japanese Laid-Open Unexamined Patent Publication No. 55-149710 suggests a roll having spalling resistance and abrasion resistance, which is obtained by hardened buildup welding with given conditions, on a surface of a roll body of the iron group, and further building up an autogenous-alloy-sprayed layer on the welded surface. The object of that invention, however, is very wide one, "rolls relating to iron manufacturing".

As for the lower pinch roll, importance lies in its performance in applying a pinch force on the passing plate material and maintaining suitable conveyance property, so as to prevent plate flaws and to put a winding shape in good order.

According to the specifications of the surface film of the roll according to Japanese Laid-Open Unexamined Patent Publication No. 55-149710, the friction coefficient is in an extremely low level, which becomes cause of plate flaws and unstableness of the winding shape due to deficiency of a gripping force on a plate material and generation of slips.

One of the present applicants previously proposed a roll for a winder in a rolling factory, which has high durability (Japanese Patent Application No. 6-282490 filed on Oct. 24, 1994, i.e. Japanese Patent Publication (Kokai) No. 5-121464).

This earlier invention, however, limits the roll proposed in Japanese Laid-Open Unexamined Patent Publication No. 55-149710 into the scope of the "roll for a winder in a rolling factory", and the material for the autogenous alloy spraying also remains to be one of the wide range of component types generally used, i.e., Ni-base material, Co-base material, and Fe-base material. From the viewpoint of roll performance, the roll applied with said material for spraying is limited in improvement in the abrasion resistance, and the value of its friction coefficient which has close relationship to the conveyance property for passing plate material is small, having weakness for smooth passing of the plate material.

An object of the present invention is to provide a roll of a winding equipment, which has been improved in the abrasion resistance, passing plate resistance, and plate flaw resistance, for solving the problems relating to the operating ratio of the equipment, repair cost, and quality assurance for the passing plate product.

DISCLOSURE OF THE INVENTION

To attain the above object, the present inventors have zealously researched to find that the friction coefficient and abrasion resistance of the autogenous-alloy-sprayed layer have close relationship with the roll property, which leads to completion of the present invention.

Namely, according to one aspect of the present invention, which has been made on the basis of the above finding, there is provided a roll of a winding equipment in a rolling factory, wherein a hardened buildup substrate is formed on a surface of a roll body, and further a carbide-particle-dispersed type autogenous-alloy-sprayed layer is formed with a thickness of 0.5 mm or more upon said substrate. According to another aspect of the invention, the autogenous-alloy-sprayed layer contains 3–60% by weight of carbide particles or complex carbide particles, and the carbide particles are particulate ones or leaf-like ones in their shapes, and are 3–300 $\mu$m in their size. According to another aspect of the invention, a base metal of the sprayed layer (Ni base, Co base, or Fe base) contains carbide particles of WC, $W_mC_n$, $Cr_3C_2$, NbC, VC, MoC, TiC, SiC, or the like, or contains particles or complex carbide particles obtained as fused and crushed particles, sintered and crushed particles, granulated particles, coated particles, from one or more kinds of primary particles of carbides and one or more kinds of binder metals.

BEST MODE FOR CARRYING OUT THE INVENTION

Figure 1A:
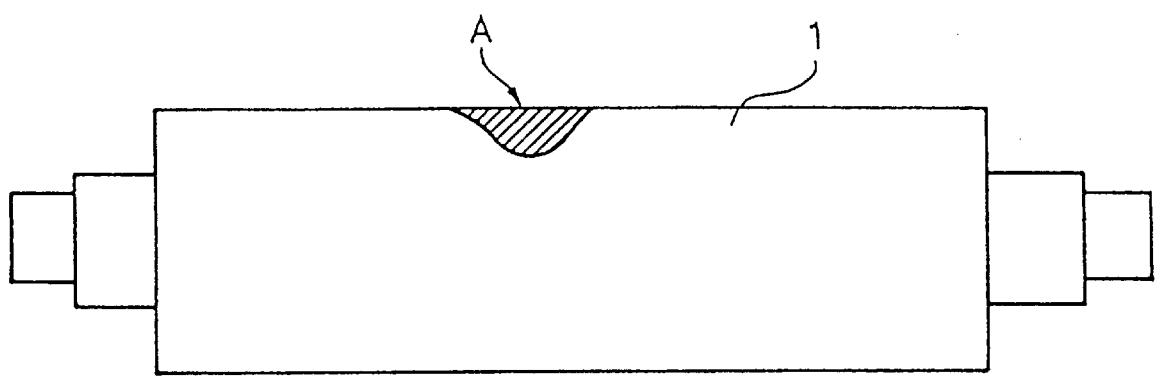
FIG. 1(a) is an explanatory view showing an outer shape of a roll of the present invention.

Now, construction and operation of the present invention will be described.

In the present invention, as a method for forming a weld metal layer, there may be used autogenous alloy spraying, powder plasma welding process, and high speed gas spraying.

As for a roll in a winding equipment, it is required that a surface film endures impact and thermal shock at the time of inrushing of passing plate material, and tumbling fatigue caused by a pressing force, and that it has bead mark resistance. Accordingly, an effective forming method is one which does not invite metallurgical bond with a hardened buildup substrate and component/structure segregation, and the autogenous alloy spraying has been employed in the present invention.

Autogenous alloy used for each roll of the winding equipment according to the present invention, i.e., carbide-particle-dispersed type weld alloy a is one in which 3–60% by weight of carbide is dispersed and contained in Ni-base, Co-base, or Fe-base metal so that its abrasion resistance is remarkably improved.

When added quantity of the carbide is less than 3% by weight, distribution of the carbide particles in the structure tends to be deviated distribution in relation to the size of the added carbide particles and a minute amount of additives, and, at the same time, great progress in the abrasion resistance can not be expected in the case of such a little quantity of addition as less than 3% by weight.

Further, when the ratio of the quantity of the carbide to the film structure exceeds 60% by weight, it leads to high production cost due to decreasing in the yield of the carbide, and cracks are generated in the production process because of decrease in the toughness of the film itself and poor fusing is generated in the sprayed layer, so that each roll can not have the performance required.

The carbide particles dispersed in the weld alloy consist of particulate ones or leaf-like ones in each shapes, and are 3–300 $\mu$m in their size. FIG. 1(b) shows a sectional model of the roll surface.

The size of the carbide particles affects the abrasion resistance and the friction coefficient. When the particles are too fine, their uniform dispersion into the weld alloy becomes difficult and segregation is generated, so that the surface hardness is not uniform, causing biased abrasion and short life of the roll.

On the other hand, the larger the particles are, the larger the abrasion resistance and the friction coefficient become. The carbide, however, has much larger abrasion resistance than the base metal, and therefore, as the base metal around the carbide particles is lost by abrasion, the carbide particles become projections, which cause generation of plate flaws.

In view of the above, the carbide particles are particulate ones or leaf-like ones in their shapes, and are 3–300 $\mu$m in the size so that each roll has the abrasion resistance, frictional coefficient, and plate flaw resistance at the same time.

As for the kind of the carbide dispersed in the weld alloy, there may be used carbide which can be granulated as spraying material, such as WC, $W_mC_n$, $Cr_3C_2$, NbC, VC, MoC, TiC, or the like. With these carbides, Ni type, Co type, or Fe type metal may be combined as the base metal, so as to vary respective characteristics of impulse abrasion resistance, corrosion abrasion resistance, thermal shock resistance, and slip seizure resistance of each roll. Thus, it becomes possible to select a material suitable for delicately varied use conditions.

Further, to improve density of the weld alloy layer, fusing treatment may be carried out.

In the following, embodiments of the present invention will be described in detail, which, however, should not be taken as limiting the invention.

Embodiment 1

An embodiment of the pinch roll of the present invention will be described.

Figure 1B:
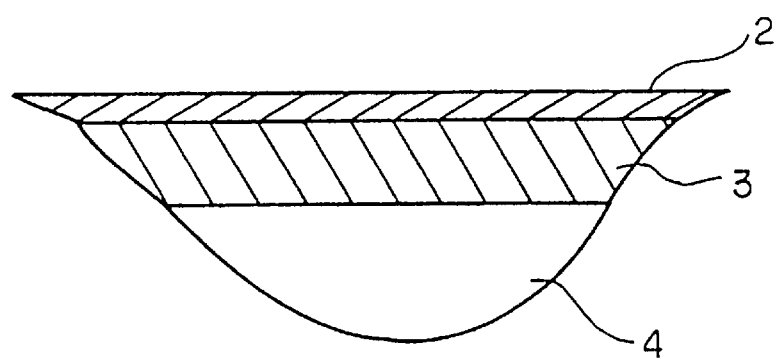
FIG. 1(b) is an enlarged section view of a surface portion A shown in FIG. 1(a)
Figure 2:
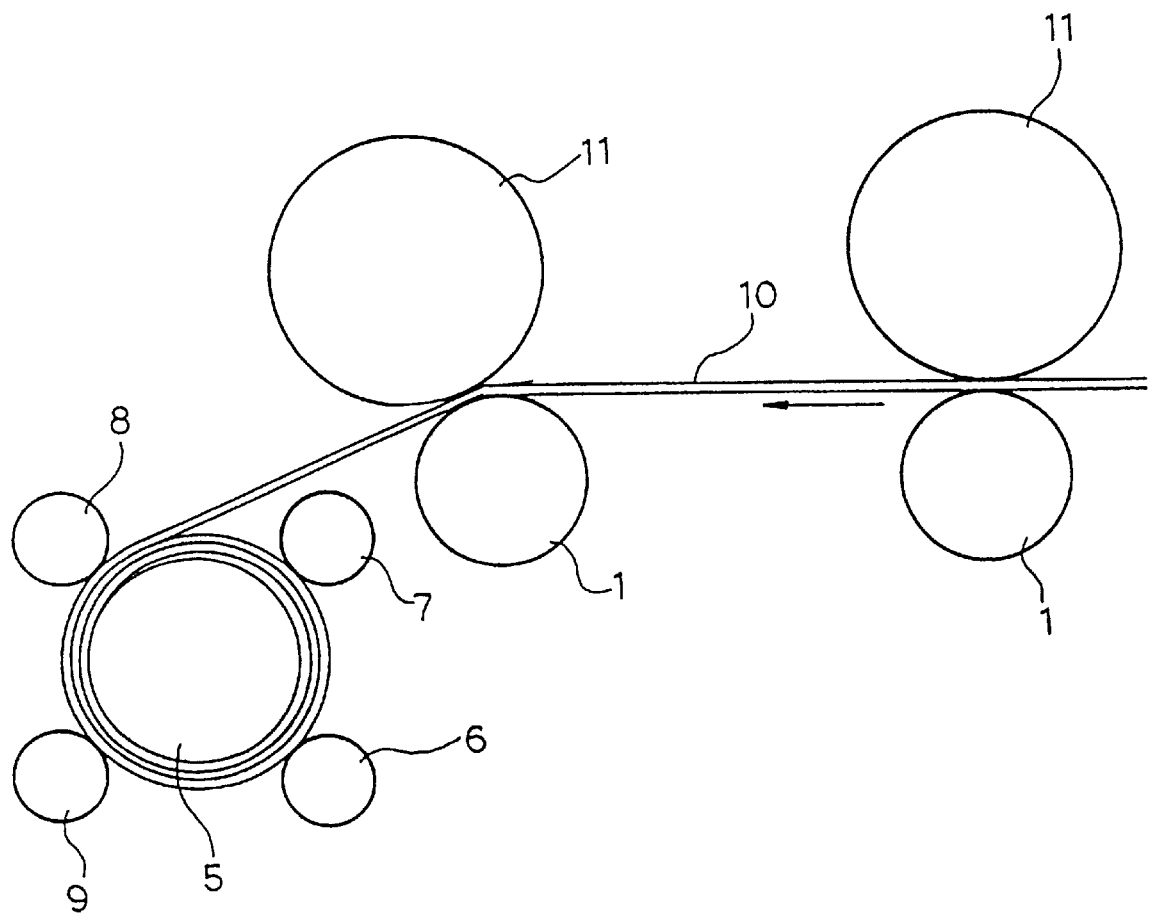
FIG. 2 is an explanatory side view showing a roll arrangement of a winding equipment in a roll factory.

The pinch roll of the present invention has the structure as shown in FIGS. 1(a) and 1(b), and its compositions of components are shown in Table 1.

TABLE 1

| | Chemical Components (% by weight) | | | | | | | | | |
|---|---|---|---|---|---|---|---|---|---|---|
| Material | C | Si | Mn | Cr | Mo | V | Ni | Fe | B | WC* |
| 1 | 0.45 | 0.23 | — | — | — | — | — | Bal. | — | — |
| 2 | 0.26 | 0.32 | 1.13 | 13.3 | 0.74 | — | 1.16 | Bal. | — | — |
| 3 | 1.70 | 3.5 | Tr | 12.3 | 1.7 | — | Bal. | 3.0 | 2.4 | 20 |
| 4 | 2.1 | 3.5 | Tr | 12.5 | 1.5 | — | Bal. | 3.0 | 2.4 | 20 |
| 5 | 0.60 | 0.9 | 1.9 | 4.3 | 1.18 | 0.74 | — | Bal. | — | — |

Material 1: roll material
Material 2: hardened buildup substrate
Material 3: particle-dispersed-type autogenous-alloy-sprayed layer
Material 4: $Cr_3C_2$ article-dispersed-type autogenous-alloy-sprayed layer
Material 5: hardened buildup layer of the conventional product
Note*: particulate granulated powder As for the specific size of the pinch roll, the outer diameter of the roll body is 508 mm $\phi$, the length of the roll body is 2300 mm, and the total length of the roll is 4570 mm. In producing the roll, it was formed to ensure that the thickness of the hardened buildup substrate was 10 mm, and the thickness of the material 3 of Table 1, i.e., the WC-particledispersed-type autogenous-alloy-sprayed layer, was 1.5 mm when the finishing process had been completed.

The pinch roll of the present invention, modified on its surface property as described above, was used in the practical operational conditions, and the following performance was confirmed.

Namely, in comparison with the roll material which has been used conventionally (hardened buildup layer of the conventional product in Table 1), the roll of the present invention has been improved by 15.6 times in its abrasion resistance, by 15.6 times in its number of continuous working days, and by 2.6 times in its total roll life. During the use, there was no trouble such as one in the conveyance property for passing plate material and flaws in the product, thus confirming that extremely excellent results could be attained.

Embodiment 2

A pinch roll was produced to have such size that the outer diameter of the roll body was 508 mm φ, the length of the roll body was 2300 mm, ensuring the thickness of 1.5 mm of the material 4 in Table 1 ($Cr_3C_2$-particle-dispersed-type autogenous-alloy-sprayed layer).

The pinch roll of the present invention, modified in the above specifications, was used in the practical operational conditions, and the following performance was confirmed.

Namely, in comparison with the roll material which has been used conventionally (hardened buildup layer of the conventional product in Table 1), the roll of the present invention has been improved by 12.8 times in its abrasion resistance, by 12.8 times in its number of continuous working days, and by 2.0 times in its total roll life. During the use, there was no trouble such as one in the conveyance property for passing plate material and flaws in the product, thus confirming that stable operational conditions could be maintained.

Industrial Applicability

As described above, the carbide-particle-dispersed-type autogenous-alloy-sprayed film formed on the pinch roll of the present invention can exhibit extremely large abrasion resistance and plate flaw resistance, and superior conveyance property for passing plate material while receiving the backup of the hardened buildup substrate, and can maintain the performance required for a pinch roll for a long time. The extreme improvement in the durability has brought such effects as improvement in the operating ratio of the equipment, reduction in the repair cost, and improvement in the quality of winding operation, and, thus, the present invention is industrially extremely useful.

We claim:

1. A roll of a winding equipment in a rolling factory, comprising a roll body, a hardened buildup substrate formed on a surface of the roll body, and a carbide-particle-dispersed autogenous-alloy-sprayed layer having a thickness of at least 0.5 mm and formed on said substrate, said sprayed layer comprising base metal selected from a group consisting of Ni, Co and Fe; and at least one kind of particles selected from a group consisting of WC, $W_mC_n$, $Cr_3C_2$, NbC, VC, MoC, TiC and SiC, said sprayed layer containing 3–60% by weight of said at least one kind of the particles, each particle having at least one of a particulate shape and a leaf shape with a size of 3–300 μm.

2. A roll of a winding equipment according to claim 1, wherein said sprayed layer has a fused surface formed by a fusing treatment for the sprayed layer.

* * * * *